United States Patent
Li et al.

(10) Patent No.: US 9,126,271 B2
(45) Date of Patent: Sep. 8, 2015

(54) METHOD FOR EMBEDDING THIN FILM SENSOR IN A MATERIAL

(75) Inventors: Xiaochun Li, Madison, WI (US);
Arindom Datta, Goleta, CA (US);
Xudong Cheng, Oak Creek, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1481 days.

(21) Appl. No.: 12/247,035

(22) Filed: Oct. 7, 2008

(65) Prior Publication Data
US 2010/0083801 A1    Apr. 8, 2010

(51) Int. Cl.
| B23B 51/00 | (2006.01) |
| G01L 5/00 | (2006.01) |
| B26D 7/00 | (2006.01) |
| B26D 1/00 | (2006.01) |
| B26D 5/00 | (2006.01) |
| B26D 7/27 | (2006.01) |
| B26F 1/44 | (2006.01) |

(52) U.S. Cl.
CPC . *B23B 51/00* (2013.01); *B26D 7/00* (2013.01); *G01L 5/0061* (2013.01); *B23B 2226/125* (2013.01); *B23B 2226/69* (2013.01); *B26D 1/0006* (2013.01); *B26D 5/00* (2013.01); *B26D 7/27* (2013.01); *B26F 1/44* (2013.01); *Y10T 29/49103* (2015.01); *Y10T 83/04* (2015.04); *Y10T 83/849* (2015.04); *Y10T 156/10* (2015.01)

(58) Field of Classification Search
CPC .... B26D 7/00; B23B 51/00; B23B 2226/125; B23B 2226/69; G01L 5/0061; Y10T 29/49103; Y10T 83/849; Y10T 83/04; Y10T 156/10

USPC ............ 29/592.1, 621.1, 830, 846; 73/862.06
See application file for complete search history.

(56) References Cited

U.S. PATENT DOCUMENTS

| 4,805,296 | A | * | 2/1989 | Jinda et al. ...................... 29/620 |
| 5,349,492 | A | * | 9/1994 | Kimura et al. .............. 361/283.4 |
| 5,610,431 | A | * | 3/1997 | Martin ........................ 257/415 |
| 5,979,243 | A | * | 11/1999 | Lei et al. ......................... 73/766 |
| 6,037,574 | A | * | 3/2000 | Lanham et al. ............... 219/544 |

(Continued)

OTHER PUBLICATIONS

Choi et al. Embedding of micro thin film sensors in sapphire by diffusion bonding, Oct. 8, 2007, J. Micromech. Microeng. 17 (2007), pp. 2248-2252.*

(Continued)

*Primary Examiner* — Livius R Cazan
(74) *Attorney, Agent, or Firm* — Bell & Manning, LLC

(57) ABSTRACT

An embedded sensor or other desired device is provided within a completed structure through a solid-state bonding process or through a dynamic bonding process. The embedded sensor or other desired device is provided on a substrate through any known or later-developed method. A cover is then bonded to the substrate using a solid-state bonding process or a dynamic bonding process. The solid-state bonding process may include providing heat and pressure to the substrate and the cover to bond the substrate and the cover together. The dynamic bonding process may include heating a bonding agent and distributing the heated bonding agent between the substrate and cover to bond the substrate and the cover together.

18 Claims, 3 Drawing Sheets

(56) References Cited

U.S. PATENT DOCUMENTS

| | | | |
|---|---|---|---|
| 6,663,982 B1* | 12/2003 | Stephens et al. | 428/621 |
| 6,876,785 B1 | 4/2005 | Li et al. | |
| 6,944,360 B2 | 9/2005 | Li et al. | |
| 2004/0012124 A1 | 1/2004 | Li et al. | |
| 2004/0040382 A1* | 3/2004 | Peterson et al. | 73/708 |
| 2004/0057589 A1* | 3/2004 | Pedersen et al. | 381/152 |
| 2004/0236524 A1* | 11/2004 | Mundt | 702/56 |
| 2006/0162849 A1* | 7/2006 | Han | 156/153 |
| 2006/0289763 A1* | 12/2006 | Mundt et al. | 250/338.3 |
| 2007/0092995 A1 | 4/2007 | Datta et al. | |

OTHER PUBLICATIONS

Choi, Hongseok, Konishi, Hiromi, Huifang, Xu and Li, Xiaochum, Embedding of Micro Thin Film Strain Sensors in Sapphire by Diffusion Bonding, Journal of Micromechanics and Microengineering, Oct. 8, 2007, pp. 2248-2252.

Werschmoeller, Dirk and Li Xiaochun, Embedding of Micro Thin Film Sensors into Polycrystaline Cubic Boron Nitride (PCBN) for Potential Tooling Applications Via Diffusion Bonding, Proceedings of the 2008 International Manufacturing Science and Engineering Conference, MSEC 2008, pp. 1-6.

* cited by examiner

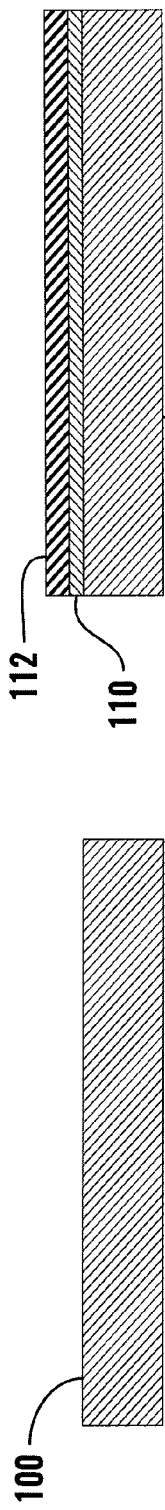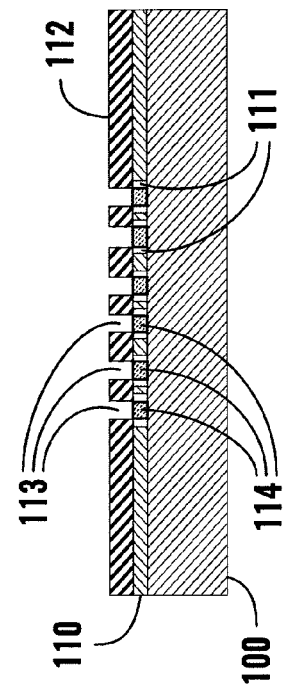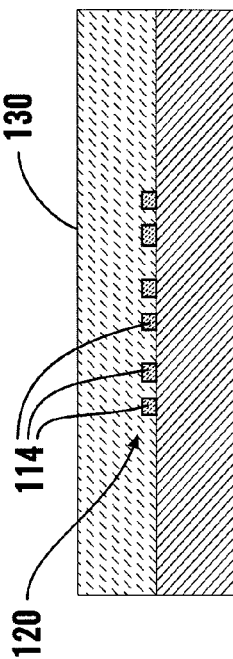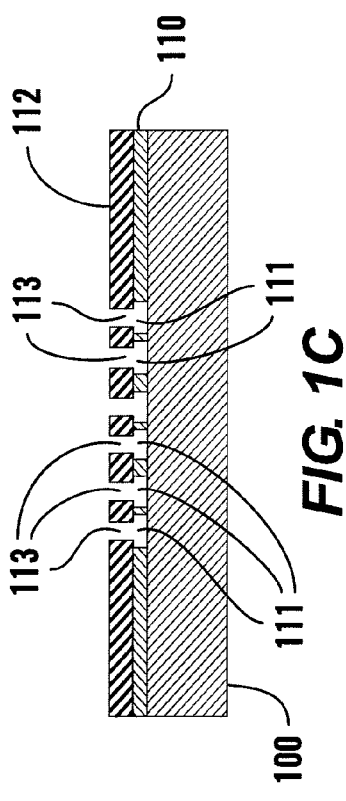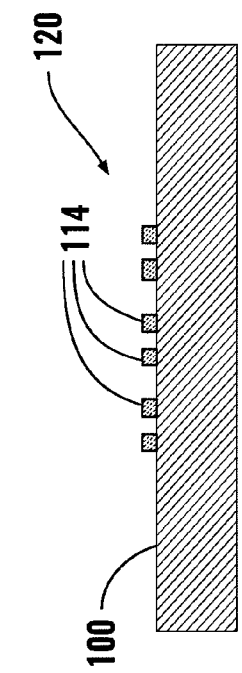

100, 130    114

100, 130    114

100    114    130

100, 130    114

METHOD FOR EMBEDDING THIN FILM SENSOR IN A MATERIAL

This invention was made with United States government support awarded by the following agencies:

NSF 0134583 and 0330356

The United States government has certain rights in this invention.

BACKGROUND

1. Field of the Invention

This invention relates to embedded thin film sensors and methods of embedding thin film sensors.

2. Related Art

Embedding sensors into a mass of material allows the sensors to sense the value of a parameter of the mass in a way that often is not possible with surface mounted sensors. Some material data, such as that relating to the internal thermal and mechanical properties of the material, can only be collected by in situ sensors. For example, internal temperature and strain data is obtained by embedding sensors into a component, with information from remote areas being extrapolated from an array of such sensors.

Moreover, due to the shape, size and/or use of the sensor and/or the device being sensed, mounting the sensors to the outside of the mass of the material might not always be possible. Such material masses include tools, dies, and the like, such as molds, drill bits, and cutter bits, elements of machines, such as turbine blades of aero-engines, static components of machines and systems, such as pressure vessels and pipes, and the like.

U.S. Published Patent Application 2004/0184700 to Li et al., incorporated herein by reference in its entirety, discloses a number of embedded sensor structures. In FIGS. 3-4B, the incorporated '700 published patent application illustrates a number of embodiments of an embedded sensor. In FIGS. 4A and 4B, the incorporated '700 published patent application illustrates a method for forming a thin film microelectronic sensor on a metal substrate and putting an encapsulating metal layer over the thin film sensor.

The incorporated '700 published patent application discloses a method for embedding a thin-film sensor in a high temperature metal bulk material. This method calls for a thin-film sensor to be fabricated on the surface of a metal substrate. First, an insulating or dielectric layer is deposited on the surface of the metal substrate. Then, a thin film sensor is fabricated on this surface using standard photolithographic processes. The sensor is then coated with an insulating ceramic layer, coated with a thin seed layer of the metal matrix material, and electroplated with the same bulk metal matrix material to further encapsulate the sensor. The sensor can then be surrounded by the bulk material by casting or by using any other appropriate, known or later-developed process, such that the sensor is placed at the appropriate location within the fabricated component. The incorporated '700 published patent application also describes a number of methods for embedding fiber optic sensors in a high melting temperature bulk material and for collecting data from an embedded sensor.

U.S. Published Patent Application 2007/0092995 to Datta et al., incorporated herein by reference in its entirety, discloses a method for embedding a device in a metal substrate. The method outlined in the incorporated '995 published patent application uses a sacrificial wafer to manufacture the device. The device is first provided on a sacrificial wafer before a high-grade metal substrate is provided over the device and the sacrificial substrate is removed.

SUMMARY OF EXEMPLARY EMBODIMENTS

While the incorporated '700 and '995 published patent applications disclose methods for embedding sensors into high-melting-temperature matrix materials, those disclosed methods are either impractical or impossible without using electroplatable materials. For example, the sensors and methods disclosed in the incorporated '700 and '995 published patent applications may not be practical or usable with ceramics, i.e., it is difficult at best; if not impossible, to use these methods to embed a sensor in a ceramic mass. Often, sensors need to be embedded in non-electroplatable materials such as, for example, certain metals and ceramics such as, for example, sapphire or polycrystalline cubic boron nitride.

This invention provides a method for embedding a thin film sensor and/or device in a non-electroplatable material.

This invention separately provides a method for providing a ceramic structure around a thin film sensor and/or device.

This invention further provides a method for bonding a substrate to a cover for embedding microelectronic devices.

This invention separately provides a thin film sensor and/or device formed and/or provided on a non-electroplatable substrate.

This invention separately provides a method for embedding a thin film sensor and/or device in a ceramic structure.

This invention separately provides a method for bonding a thin film sensor and/or device to a substrate and/or a cover.

This invention separately provides a ceramic or other non-electroplatable structure with an embedded thin film sensor and/or device.

This invention separately provides a method of manufacturing a tool with an embedded sensor near a tool-work interface region of the tool.

This invention separately provides a method of monitoring thermodynamic phenomena in a tool-work interface of a tool.

It should be appreciated that, while the below-outlined exemplary embodiments of methods and structure may be particularly useful to embed one or more thin film sensors and/or devices in a non-electroplatable material, electroplatable materials, if desired, may also be used with the below-outlined exemplary embodiments. In general, any material usable with a solid-state bonding process and/or a dynamic bonding process may be used, at least in part, with the below-outlined exemplary embodiments.

In various exemplary embodiments of methods and structures according to this invention, a method for forming a ceramic or other non-electroplatable structure uses a solid-state bonding process (e.g., diffusion bonding) and/or a dynamic bonding process (e.g., brazing) to couple two or more portions of the structure into a single unit. In various exemplary embodiments, the structure includes a substrate and a cover, which are coupled together by a solid-state bonding process (e.g., by diffusion bonding) and/or a dynamic bonding process (e.g., brazing) under elevated temperature and/or pressure. In various exemplary embodiments, a thin film sensor and/or device is provided on the substrate before the substrate and the cover are coupled together. In various exemplary embodiments, the thin film sensor and/or device are provided on the substrate through a photolithography process. In various exemplary embodiments, the substrate is diffusion bonded to the cover under elevated temperature and/or pressure. In various exemplary embodiments, the substrate and the cover are coupled together with a brazing process, which includes heating a filler metal or alloy to a melting temperature that is below the melting temperature of the material used to make either of the substrate and/or the cover. Typically this temperature is at least approximately 450° C.

In various exemplary embodiments of methods and structures according to this invention, a thin film sensor and/or device is embedded within a structure through a solid-state bonding process (e.g., by diffusion bonding) and/or a dynamic bonding process (e.g., brazing). In various embodiments, the thin film sensor and/or device is a thin film stress gauge made of palladium-13 wt % chromium (PdCr), which reacts to changes in pressure by changing its internal resistance in an approximately linear fashion. In various exemplary embodiments, the structure is a sapphire structure, including a sapphire substrate and a sapphire cover. In various other embodiments, the structure is a polycrystalline cubic boron nitride structure, including a polycrystalline cubic boron nitride substrate and a polycrystalline cubic boron nitride cover. In various embodiments, the thin film sensor and/or device (e.g., the thin film stress gauge) is provided on the sapphire or polycrystalline cubic boron nitride substrate and the sapphire or polycrystalline cubic boron nitride cover is bonded to the substrate and the thin film sensor and/or device using a solid-state bonding process (e.g., by diffusion bonding) and/or using a dynamic bonding process (e.g., by brazing).

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein:

FIGS. 1A-1F is schematic view of an exemplary method of manufacturing an embedded thin film sensor according to this invention;

DESCRIPTION OF EXEMPLARY
EMBODIMENTS

FIGS. 1A-1F show an exemplary embodiment of a method for embedding a thin film sensor or other desired device in a ceramic structure. In the exemplary embodiments of the method shown in FIGS. 1A-1F, one or more thin film sensors, such as, for example, thin film strain gauges, or any other desired device(s), are provided on a substrate. A cover is then bonded to the substrate using a solid-state bonding process and/or a dynamic bonding process, thereby embedding the thin film sensor(s) or other desired device(s) between the substrate and the cover.

In one exemplary embodiment, the thin film sensor(s) or other desired device(s) are thin film strain gauges made from palladium-13 wt % chromium and the substrate and the cover are each made from sapphire. In another exemplary embodiment, the thin film sensor(s) or other desired device(s) are thin film strain gauges made from palladium-13 wt % chromium and the substrate and the cover are each made from polycrystalline cubic boron nitride. It should be appreciated that the below-outlined thin film sensor(s) and/or other device(s) may be any known or later-developed suitable thin film sensor and/or other desired device and that the substrate and cover may be any known or later-developed, similar or dissimilar, suitable substrate and cover.

In the exemplary method shown in FIGS. 1A-1F, as shown in FIGS. 1A-1C, a thin film sensor 120 or other desired device (such as, for example, a thin film strain gauge) is provided on a substrate 100 (such as, for example, a sapphire or a polycrystalline cubic boron nitride substrate) using, for example, a photolithography process. According to the exemplary photolithography process shown in FIG. 1B, a layer 110 of lift-off resist, such as, for example, LOR-3A (available from Microchem of Newton, Mass.), is provided on the substrate 100. In one exemplary embodiment the layer 110 of LOR-3A is spin-coated on or over the substrate 100 by spinning the substrate at approximately 2500 rpm for approximately 30 seconds. In this exemplary embodiment, the substrate 100 is then baked on a hotplate at approximately 150° C. for a period of approximately 12 minutes.

Figure 2:
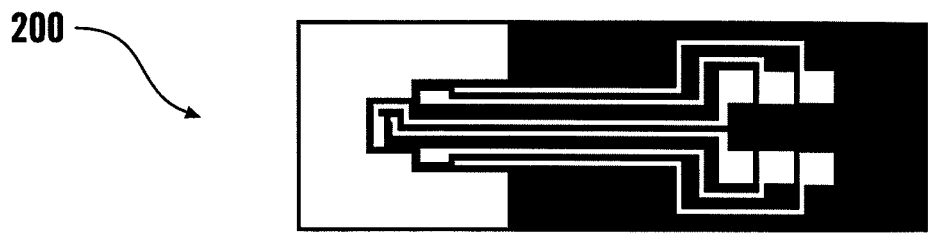
FIG. 2 is a top plan view of an exemplary embodiment of a mask design for forming a thin film sensor according to this invention.

As shown in FIG. 1C, in the exemplary photolithography process, a layer 112 of positive photoresist, such as for example, S1813 positive photoresist (available from Rohm & Haas of Philadelphia, PA), is then provided on top of the layer 110 of lift-off resist. In one exemplary embodiment, the layer 112 of S1813 positive photoresist is spin-coated on or over the layer 110. In this exemplary embodiment, the substrate 100 is then baked in a baking oven at approximately 90° C. for a period of approximately five minutes. In the exemplary photolithography process, the substrate 100, the layer 110 of lift-off resist and the layer 112 of positive photoresist are then exposed to a masked UV light source (not shown) using, for example, a Karl Suss standard MJB-3 contact aligner with a photomask 200 for micro-thin film strain gauges. FIG. 2 shows one exemplary embodiments of such a photomask 200.

After exposing the substrate 100, including the layer 110 of lift-off resist and the layer 112 of positive photoresist to the masked UV light source, the substrate 100, including the exposed area, is developed using a photoresist developer such as, for example, MF-321 (available from Rohm & Haas of Philadelphia Pa.), to remove portions of the layer 110 of lift off resist and portions of the layer 112 of positive photoresist according to the pattern of the mask 200 used to expose the layer 110 of lift-off resist and the layer 112 of positive photoresist. As a result, gaps 111 and 113 are provided in the layer 110 of lift-off resist and the layer 112 of positive photoresist, respectively.

It should be appreciated that the layer 112 of positive photoresist is shown with an overhang on top of the layer 110 of lift-off resist because many types of lift-off resist, such as the exemplary lift-off resist LOR-3A, have a higher dissolution rate than many types of positive photoresist, such as the exemplary S1813 positive photoresist, in at least some developers. In various exemplary embodiments, the type of lift-off resist used and the type of positive photoresist used may have the same dissolution rate. In various other exemplary embodiments, a single layer of any known or later-developed photoresist may be used.

It should be appreciated that the above-outlined overhang of the layer 112 of positive photoresist over the layer 110 of lift-off resist may be advantageous during a later lift-off step. In various exemplary embodiments, the overhang helps remove the layer 110 of lift-off resist and any materials provided on top of it (e.g., the layer 112 of positive photoresist). For example, a layer provided on top of the layer 112 of positive photoresist may coat the edges of the gaps 113 in the layer 112 of positive photoresist but may not coat the edges of the gaps 111 in the layer 110 of lift-off resist. As such, when the layer 110 of lift-off resist is removed, the layer 112 of positive photoresist 112 and any material coating the edges of the gaps 113 in the layer 112 of positive photoresist will be removed. In contrast, if the edges of the gaps 111 and the edges of the gaps 113 are aligned, material that coats the edges of the gaps 113 in the layer 112 of positive photoresist may remain after the layer 110 of lift-off resist and the layer 112 of positive photoresist are removed.

In the above-outlined exemplary method, a photolithography process is used to provide a template for the thin film sensor 120 or other desired device on the substrate 100. It should be appreciated that any known or later-developed method may be used to provide the thin film sensor 120 or other desired device on the substrate 100. Such known or later-developed methods may omit one or more of the above-outlined steps used to create a template and/or may use one or more of the steps, or may provide the thin film sensor 120 or other desired device directly on the substrate 100.

The thin film sensor 120 or other desired device is now provided on or over the substrate 100. In the above-outlined exemplary method, a layer 114 of conductive material, such as, for example a layer of palladium-13 wt % chromium alloy, is provided at least in the gaps 111 through the gaps 113. It should be appreciated that, in various other exemplary embodiments that do not use a photolithography process, the desired conductive path may be provided on the substrate 100 in a single step. For example, the layer 114 of conductive material may be drawn, printed or otherwise provided on or over the substrate 100 without the use of a template.

In the above-outlined exemplary process, the layer 114 of conductive material is provided at least in the gaps 111 through the gaps 113 by, for example, using a CVC 601 DC sputtering system to deposit a 400 nm layer of palladium-13 wt % chromium alloy. It should be appreciated that, in various exemplary embodiments, the layer 114 of conductive material may include multiple layers of conductive material. For example, the layer 114 of conductive material may include a first layer of pure chromium and a second layer of a chromium alloy, such as the exemplary layer of palladium-13 wt % chromium alloy. In various embodiments, an adhesion layer, such as the first layer of pure chromium, helps bond the layer 114 of conductive material to the substrate 100 and may help compensate for a surface roughness of the substrate 100.

The layer 110 of lift-off resist, and any layers on top of the layer 110 of lift off resist (e.g., the layer 112 of positive photoresist and/or portions of the layer 114 of conductive material), are then removed using, for example, acetone and/or MF-321 developer, leaving just the layer 114 of conductive material on the substrate 100 in the desired shape of the mask 200.

In the exemplary photolithography process, the layer 114 of conductive material that remains after removing the layer 110 of lift-off resist forms a thin film sensor 120 or other desired device. A cover 130, which may be a sapphire or polycrystalline cubic boron nitride cover that is similar in structure and/or composition to the substrate 100, is then coupled to the substrate 100 using a solid-state bonding process (e.g., diffusion bonding) and/or a dynamic bonding process (e.g., brazing) to embed the thin film sensor 120 or other desired device within the completed structure (i.e., the object formed by bonding the cover 130 to the substrate 100). It should be appreciated that this completed structure (i.e., the combined substrate 100 and cover 130) may itself be a part of another structure. For example, the substrate 100 and the cover 130 may be encapsulated, cast around or otherwise provided within another structure of a desired size and shape.

It should also be appreciated that the thin film sensor 120 or other desired device may be manufactured or otherwise provided on the substrate 100 using any known or later-developed apparatus, system or method. As such, the layer 110 of lift-off resist, the layer 112 of positive photoresist and the steps of providing and removing such layers (e.g., the above-outlined spin-coating processes), may be replaced with any other suitable known or later-developed processes or steps usable to provide a thin film sensor or other desired device on a substrate. Likewise, the substrate 100 and the cover 130 may be any known or later-developed similar or dissimilar substrate and cover usable to form a structure which desirably includes an embedded device.

In various exemplary embodiments, the above-outlined solid-state bonding process and/or dynamic bonding process is a diffusion bonding process. The diffusion bonding process includes applying heat and pressure to the substrate 100 and the cover 130 to couple the substrate 100 and the cover 130 together. In general, in the diffusion bonding process, heat is applied to the substrate 100 and the cover 130 to raise their temperature to between approximately 50% and approximately 80% of the melting point of the material used to make the substrate 100 and/or the cover 130 (e.g., sapphire or polycrystalline cubic boron nitride). The diffusion bonding step may be performed in a protective atmosphere (e.g., surrounded by an inert gas) or in a vacuum.

In one exemplary embodiment, the substrate 100 and the cover 130 are each pieces of sapphire and the two pieces of sapphire are diffusion bonded together at a temperature of approximately 1050° C. and a pressure of approximately 1 MPa for a time period of approximately 1 hour. In another exemplary embodiment, the substrate 100 and the cover 130 are each pieces of polycrystalline cubic boron nitride and the two pieces of polycrystalline cubic boron nitride are diffusion bonded together by raising the temperature of the substrate 100 and the cover 130 to a temperature of approximately 1200° C. over a time period of approximately 11.5 hours under a pressure of approximately 1.57 MPa and then lowering the temperature of the substrate 100 and the cover 130 to an ambient temperature over a time period of approximately 11.5 hours under the same pressure of approximately 1.57 MPa.

In various other embodiments, the above-outlined solid-state bonding process and/or dynamic bonding process is a brazing process. The brazing process may include heating a filler metal or alloy to a melting temperature, typically above approximately 450° C., which is below the melting point of the material used to create either the substrate 100 and/or the cover 130 (e.g., below the melting temperature of sapphire and/or polycrystalline cubic boron nitride). The melted filler metal or alloy may then be distributed between the substrate 100 and the cover 130 by capillary action and/or the filler metal or alloy may bond to each of the substrate 100 and the cover 130 at a joint between the substrate 100 and the cover 130.

In various exemplary embodiments, the brazing process is aided by a flux that helps prevent oxides from forming while the filler metal or alloy is heated and/or helps spread the filler metal or alloy to enter the joint between the substrate 100 and the cover 130. The brazing process may provide a layer of the filler metal or alloy between the substrate 100 and the cover 130 that is metallurgically linked to each of the substrate 100 and the cover 130, creating a strong bond between the substrate 100 and the cover 130.

Figure 3:
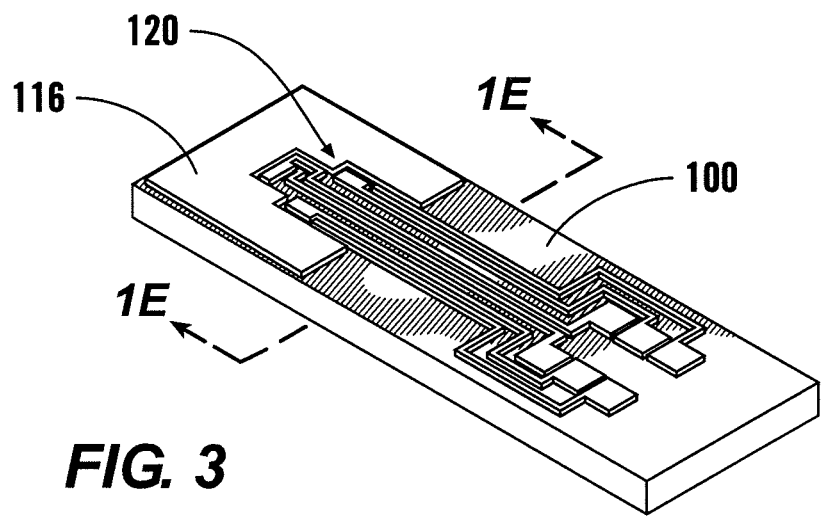
FIG. 3 is a perspective view of an exemplary embodiment of a thin film sensor provided on a substrate according to this invention.

As outlined above, FIG. 2 shows an exemplary embodiment of a mask 200 usable to provide an exemplary embodiment of a thin film sensor 120 using the method shown in FIGS. 1A-1F. FIG. 3 shows a resulting pattern of a thin film sensor 120 provided on the substrate 100 using the mask 200 shown in FIG. 2. FIG. 3 also shows a diffusion bonding area 116 where an additional amount of palladium-13 wt % chromium alloy, which may not be necessary for the function of the thin film sensor 120 or other desired device, may be deposited to aid the above-outlined bonding process. It should be appreciated that, in various embodiments, the diffusion bonding area 116 may be omitted.

Figure 4:
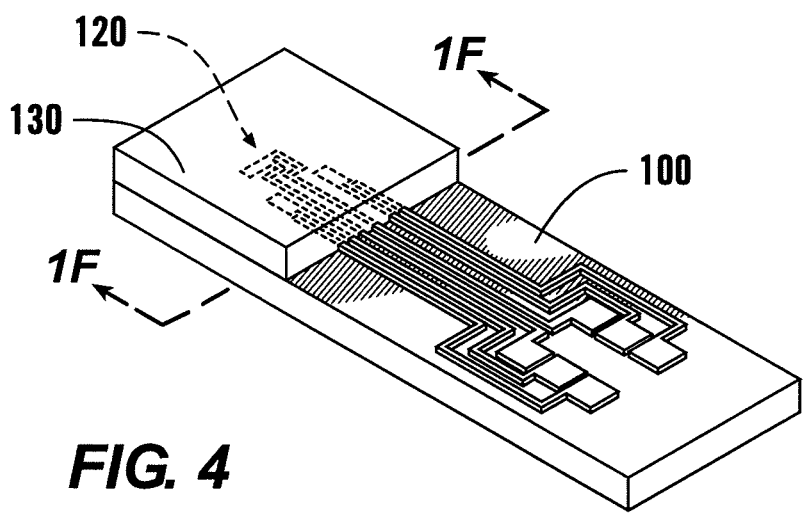
FIG. 4 is a perspective view of an exemplary embodiment of a thin film sensor embedded between a substrate and a cover according to this invention.

FIG. 4 shows a completed structure with the thin film sensor 120 or other desired device embedded between the substrate 100 and the cover 130. As shown in FIG. 4, the cover 130 is bonded to the substrate 100, creating a single structure, which may not be separable using any non-destructive process. As also shown in FIG. 4, there is at least a first region where the cover 130 is bonded to the layer 114 of conductive material and at least a second region where the cover 130 is bonded to the substrate 100. The substrate 100 and the cover 130 of the completed structure shown in FIG. 4 may be bonded together using the above-outlined diffusion bonding process, the above-outlined brazing process and/or any other known or later-developed solid-state bonding and/or dynamic bonding process.

It should be appreciated that other structures can be made by altering the completed structure shown in FIG. 4. For example, the structure shown in FIG. 4 may be encapsulated in another material or the structure shown in FIG. 4 may be tooled or otherwise formed into a desired shape. In such exemplary embodiments, the thin film sensor 120 or other desired device may be located closer to a working edge of the tool than has been possible with traditional methods of providing sensors for cutting tools.

Locating a sensor closer to a working edge of a tool, such as for example the cutting edge of a cutting tool, may help allow more precise measurements of forces, temperatures and other desired phenomena in a tool-work interface region. In many cases these desired phenomena follow complex thermodynamic relations that do not allow for indirect measurement and thus cannot be measured using traditional methods.

It should be appreciated that the finished structure may be particularly useful for various manufacturing processes. In various exemplary embodiments, the finished structure is particularly useful for hard milling and turning, precision metal forming, cutting tools for hard machining, dry machining and/or friction stir welding of high melting temperature materials. In such exemplary embodiments, the embedded thin film sensor 120 or other desired device may be useful to help monitor and control critical tool conditions, such as, for example, temperature and strain and may help enable early detection of potential problems, which may result in reduced damage to the structure, higher quality use of the structure as a tool, less downtime of the structure for repair and/or less energy consumption involved in using the structure as a tool.

Figure 5:
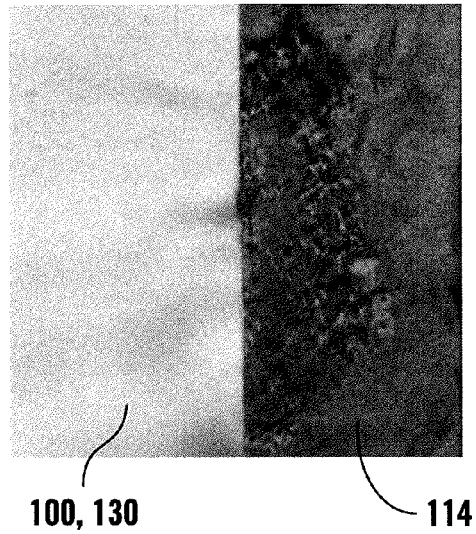
FIG. 5 is a cross-sectional view of an interface region between the thin film sensor and the substrate or cover of FIG. 4 under a first lighting condition.
Figure 6:
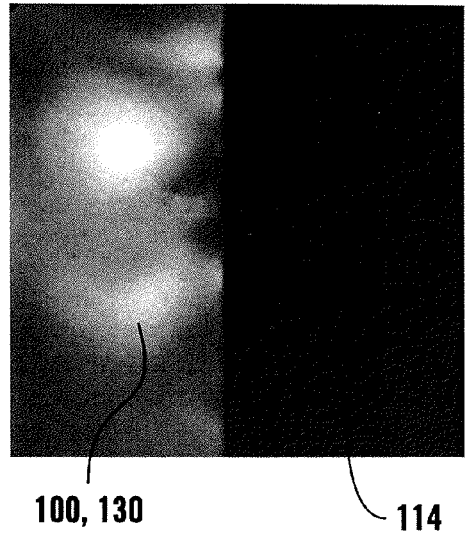
FIG. 6 is a cross-sectional view of the interface region between the thin film sensor and the substrate or cover of FIG. 4 under a second lighting condition.
Figure 7:
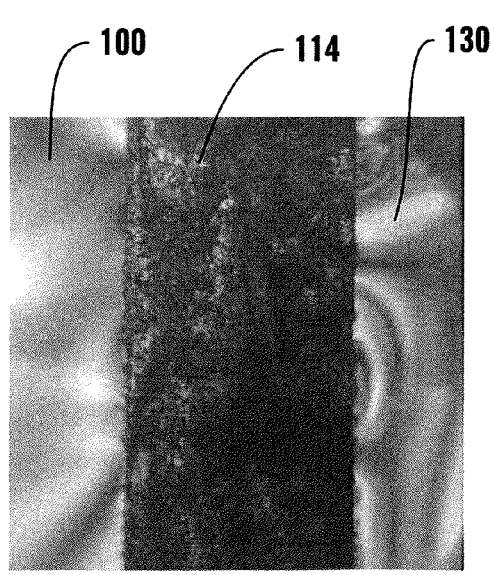
FIG. 7 is a cross-sectional view of the interface between the thin film sensor, the substrate and the cover of FIG. 4 showing the substrate and the cover on opposing sides of the thin film sensor.

FIG. 5 shows a cross-sectional view of a bonding region between the layer 114 of conductive material and the substrate 100 and/or the cover 130 under a first lighting condition, which, in these exemplary embodiments, is a bright-field condition. FIG. 6 shows a cross-sectional view of the bonding region between the layer 114 of conductive material and the substrate 100 and/or the cover 130 under a second lighting condition, which, in these exemplary embodiments, is a dark-field condition. FIG. 7 is a cross-sectional view showing a low-magnification image from a transmission electron microscope showing the substrate 100, the layer of 114 of conductive material and the cover 130. As shown in FIGS. 5-7, the substrate 100 and/or the cover 130 show signs of local stress near the interface with the layer 114 of conductive material, indicating that chemical bonding has occurred in the bonding region on either or both sides of the layer 114 of conductive material.

Figure 8:
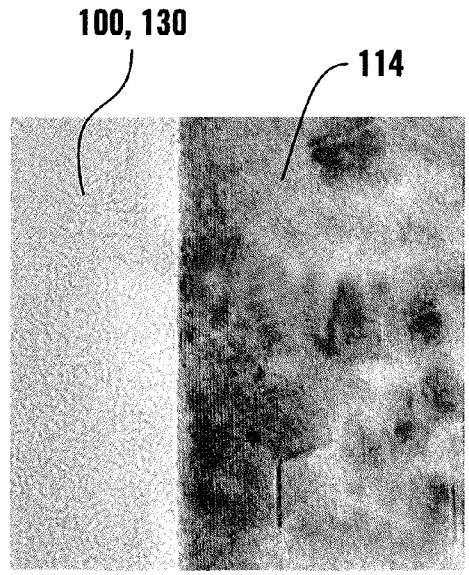
FIG. 8 is a detailed cross-sectional view of the interface between the thin film sensor and the substrate or cover of FIG. 4.

FIG. 8 shows a high-resolution transmission electron microscope (HRTEM) image of the interaction between the layer 114 of conductive material and the substrate 100 and/or cover 130. In one exemplary embodiment, the substrate 100 and the cover 130 are each made of sapphire, the layer 114 of conductive material includes palladium-13 wt % chromium alloy and the orientation relationship between the substrate 100 and the layer 114 of conductive material, and/or the orientation relationship between the cover 130 and the layer 114 of conductive material is [001] of sapphire/[111] of PdCr.

It should be appreciated that, in various exemplary embodiments, the substrate 100 and/or the cover 130 may be made of a conductive material (e.g., the substrate 130 may be a metal substrate). In such exemplary embodiments, a dielectric or insulating layer may be provided between the thin film sensor 120 or other desired device and the substrate 100 and/or the cover 130. For example, in various exemplary embodiments, a first dielectric or insulating layer may be provided on or over the substrate 100 before the thin film sensor 120 or other desired device is provided on the substrate 100 and/or a second dielectric or insulating layer may be provided on or over the thin film sensor 120 or other desired device and between the thin film sensor 120 or other desired device and the cover 130. The dielectric or insulating layers may help to prevent the thin film sensor 120 or other desired device from shorting out or from electrically connecting to undesired portions of the structure.

While various exemplary embodiments according to this invention have been described above, various alternatives, modifications, variations, improvements and/or substantial equivalents, whether known or that are or may be presently unforeseen, may become apparent to those having at least ordinary skill in the art. Accordingly, the exemplary embodiments according to this invention, as set forth above, are intended to be illustrative, not limiting of the scope of this invention. Various changes may be made without departing from the spirit and scope of this invention. Therefore, this invention is intended to embrace embodiments beyond those outlined above, as well as all known or later-developed alternatives, modifications, variations, improvements, and/or substantial equivalents of the exemplary embodiments outlined above.

The invention claimed is:

1. A method for forming a thin film sensor embedded in a material, the method comprising:
   forming a thin film sensor on or over a surface of a substrate, and bonding a cover to the surface of the substrate using a solid-state bonding process or a dynamic bonding process to provide the thin film sensor embedded in the material, wherein the material comprises the substrate and the cover, and further wherein the substrate, the cover, or both is sapphire, further comprising forming the embedded sensor into a cutting tool adapted for hard machining, dry machining, friction stir welding, or combinations thereof.

2. The method of claim 1, wherein the bonding step uses the dynamic bonding process and further wherein the dynamic bonding process is brazing comprising heating a filler metal or alloy at a temperature and distributing the heated filler metal or alloy between the substrate and the cover.

3. The method of claim 2, wherein the temperature is below the melting temperature of at least one of the cover and the substrate.

4. The method of claim 1, wherein the material does not comprise an electroplatable material.

5. The method of claim 1, wherein the substrate, the cover, or both is a non-electroplatable material.

6. The method of claim 1, wherein the substrate, the cover, or both is a ceramic material.

7. The method of claim 1 wherein the thin film sensor comprises PdCr.

8. The method of claim 1, wherein the thin film sensor is a thin film stress gauge adapted to sense strain in the material.

9. The method of claim 1, wherein the thin film sensor is chemically bonded to the substrate, the cover, or both.

10. The method of claim 1, wherein the bonding step uses the solid-state bonding process.

11. The method of claim 10, wherein the solid-state bonding process is diffusion bonding comprising heating the cover and the substrate at a temperature under pressure for a period of time.

12. The method of claim 11, wherein the temperature is between approximately 50% and approximately 80% of the melting temperature of at least one of the cover and the substrate.

13. The method of claim 1, wherein the thin film sensor is deposited directly on the surface of the substrate, and further wherein the cover is bonded to the surface of the substrate and to the surface of the deposited thin film sensor using the solid-state bonding process.

14. The method of claim 13, wherein the substrate is sapphire and the cover is sapphire.

15. The method of claim 14, wherein the thin film sensor comprises PdCr.

16. A method for forming a thin film sensor embedded in a material, the method comprising:

forming a thin film sensor on or over a surface of a substrate, and bonding a cover to the surface of the substrate using a solid-state bonding process or a dynamic bonding process to provide the thin film sensor embedded in the material, wherein the material comprises the substrate and the cover, and further wherein the substrate, the cover, or both is sapphire, further comprising forming the embedded sensor into a drill bit.

17. The method of claim 16, wherein the bonding step uses the solid-state bonding process.

18. The method of claim 17, wherein the solid-state bonding process is diffusion bonding comprising heating the cover and the substrate at a temperature under pressure for a period of time.

* * * * *